(12) United States Patent
Nechyba et al.

(10) Patent No.: US 9,047,538 B2
(45) Date of Patent: *Jun. 2, 2015

(54) FACIAL IMAGE QUALITY ASSESSMENT (71) Applicant: Google Inc., Mountain View, CA (US)

(72) Inventors: Michael Christian Nechyba, Pittsburgh, PA (US); Michael Andrew Sipe, Pittsburgh, PA (US)

(73) Assignee: Google Inc., Mountain View, CA (US)

( * ) Notice: Subject to any disclaimer, the term of this patent is extended or adjusted under 35 U.S.C. 154(b) by 87 days.

This patent is subject to a terminal disclaimer.

(21) Appl. No.: 13/891,843

(22) Filed: May 10, 2013

(65) Prior Publication Data
US 2013/0336527 A1 Dec. 19, 2013

Related U.S. Application Data (63) Continuation of application No. 13/524,745, filed on Jun. 15, 2012, now Pat. No. 8,441,548.

(51) Int. Cl.
*H04N 5/228* (2006.01)
*H04N 5/232* (2006.01)
*G06K 9/62* (2006.01)
*G06K 9/00* (2006.01)
*G06K 9/03* (2006.01)

(52) U.S. Cl.
CPC .............. *G06K 9/6267* (2013.01); *H04N 5/228* (2013.01); *G06K 9/00221* (2013.01); *H04N 5/23212* (2013.01); *H04N 5/23293* (2013.01); *H04M 2250/00* (2013.01); *G06K 9/00228* (2013.01); *G06K 9/036* (2013.01)

(58) Field of Classification Search
CPC ........ H04N 5/228; H04N 5/232; H04N 9/045
USPC .......................................................... 348/222.1
See application file for complete search history.

(56) References Cited

U.S. PATENT DOCUMENTS

| 6,343,141 | B1 * | 1/2002 | Okada et al. ................... 382/118 |
| 7,130,454 | B1 * | 10/2006 | Berube et al. .................. 382/118 |
| 7,512,254 | B2 * | 3/2009 | Vollkommer et al. ......... 382/115 |
| 7,609,908 | B2 * | 10/2009 | Luo et al. ....................... 382/274 |
| 7,702,314 | B2 * | 4/2010 | Kang ............................. 455/411 |
| 7,711,158 | B2 * | 5/2010 | Ahn et al. ...................... 382/124 |

(Continued)

OTHER PUBLICATIONS

Search Report from Application No. GB1310556.4, dated Jul. 2, 2013, 4 pgs.

(Continued)

*Primary Examiner* — Nicholas Giles
*Assistant Examiner* — Abdelaaziz Tissire
(74) *Attorney, Agent, or Firm* — Shumaker & Sieffert, P.A.

(57) ABSTRACT

An example method includes capturing, by a camera of a mobile computing device, an image, determining whether the image includes a representation of at least a portion of a face, and, when the image includes the representation of at least the portion of the face, analyzing characteristics of the image. The characteristics include at least one of a tonal distribution of the image that is associated with a darkness-based mapping of a plurality of pixels of the image, and a plurality of spatial frequencies of the image that are associated with a visual transition between adjacent pixels of the image. The method further includes classifying, by the mobile computing device, a quality of the image based at least in part on the analyzed characteristics of the image.

22 Claims, 5 Drawing Sheets

(56) References Cited

U.S. PATENT DOCUMENTS

| | | | |
|---|---|---|---|
| 8,081,227 B1* | 12/2011 | Kim et al. | 348/211.3 |
| 8,441,548 B1* | 5/2013 | Nechyba et al. | 348/222.1 |
| 2002/0191817 A1* | 12/2002 | Sato et al. | 382/118 |
| 2003/0103647 A1* | 6/2003 | Rui et al. | 382/103 |
| 2003/0151674 A1* | 8/2003 | Lin | 348/222.1 |
| 2004/0175021 A1* | 9/2004 | Porter et al. | 382/118 |
| 2005/0041034 A1* | 2/2005 | Luo et al. | 345/589 |
| 2005/0047655 A1* | 3/2005 | Luo et al. | 382/167 |
| 2005/0047656 A1* | 3/2005 | Luo et al. | 382/167 |
| 2005/0089246 A1* | 4/2005 | Luo | 382/286 |
| 2005/0219362 A1* | 10/2005 | Garoutte | 348/180 |
| 2005/0219400 A1* | 10/2005 | Poulsen | 348/345 |
| 2006/0093208 A1* | 5/2006 | Li et al. | 382/159 |
| 2006/0140445 A1* | 6/2006 | Cusack, Jr. | 382/103 |
| 2006/0158307 A1* | 7/2006 | Lee et al. | 340/5.53 |
| 2006/0177110 A1* | 8/2006 | Imagawa et al. | 382/118 |
| 2007/0014542 A1* | 1/2007 | Poulsen | 386/107 |
| 2009/0160609 A1* | 6/2009 | Lin et al. | 340/5.83 |
| 2009/0258667 A1* | 10/2009 | Suzuki et al. | 455/550.1 |
| 2010/0266180 A1* | 10/2010 | Kadir et al. | 382/131 |
| 2011/0001840 A1* | 1/2011 | Ishii et al. | 348/222.1 |
| 2011/0122254 A1* | 5/2011 | Ishii et al. | 348/169 |
| 2011/0129149 A1* | 6/2011 | Kang | 382/168 |
| 2011/0317872 A1* | 12/2011 | Free | 382/103 |
| 2011/0317917 A1* | 12/2011 | Free | 382/167 |
| 2012/0070102 A1* | 3/2012 | Yokokawa et al. | 382/286 |

OTHER PUBLICATIONS

Office Action from U.S. Appl. No. 13/524,745, dated Aug. 31, 2012, 41 pp.

Response to Office Action dated Aug. 31, 2012, from U.S. Appl. No. 13/524,745, filed Nov. 30, 2012, 16 pp.

Notice of Allowance from U.S. Appl. No. 13/524,745, dated Jan. 14, 2013, 24 pp.

DForum, "Histogramm der Tonwertverteilung bza. RGB-Diagramm," 2004, retrieved from http://www.dforum.net/showthread.php?t=347936 on Feb. 11, 2014, (including English translation) 3 pp.

Guan, "Robust Eye Detection from Facial Image based on Multi-cue Facial Information." 2007 IEEE International Conference on Control and Automation, Guangzhou, China, May 30-Jun. 1, 2007, 4 pp.

Sung et al., "Example-Based Learning for View-Based Human Face Detection," IEEE Transactions on Pattern Analysis and Machine Intelligence, vol. 20, No. 1, Jan. 1998, 14 pp.

Waring et al., "Face Detection Using Spectral Histograms and SVMs," IEEE Transactions on Systems, Man, and Cybernetics—Part B: Cybernetics, vol. 35, No. 3, Jun. 2005, 10 pp.

Examination Report from German patent application No. 10 2013 009 901.3, dated Feb. 3, 2014, 12 pp.

Combined Search and Examination Report from UK Application No. GB1411013.4, issued Dec. 22, 2014 3 pp.

\* cited by examiner

FACIAL IMAGE QUALITY ASSESSMENT

This application is a continuation of U.S. application Ser. No. 13/524,745, filed Jun. 15, 2012, the entire contents of which are incorporated herein by reference.

TECHNICAL FIELD

The present disclosure relates to facial recognition technology, and more specifically, to the assessment of the quality of images captured for use in facial recognition.

BACKGROUND

A user may activate or otherwise gain access to functionalities of a mobile computing device by "unlocking" the device. In some instances, a mobile computing device may be configured to permit unlocking based on authentication information provided by the user. Authentication information may take various forms, including alphanumeric passcodes and biometric information. Examples of biometric information include fingerprints, retina scans, and facial images. A mobile computing device may authenticate a facial image input using facial recognition technology.

SUMMARY

In one example, a method includes capturing an image, determining whether the image includes a representation of at least a portion of a face, and when the image includes the representation of at least the portion of the face, analyzing characteristics of the image. The characteristics include at least one of a tonal distribution of the image that is associated with a darkness-based mapping of a plurality of pixels of the image, and a plurality of spatial frequencies of the image that are associated with a visual transition between adjacent pixels of the image. The method further includes classifying a quality of the image based at least in part on the analyzed characteristics of the image.

In another example, a computer-readable storage device includes instructions for causing at least one processor of a mobile computing device to perform operations. The operations include capturing, by a camera of the mobile computing device, an image, determining whether the image includes a representation of at least a portion of a face, and when the image includes the representation of at least the portion of the face, analyzing characteristics of the image. The characteristics include at least one of a tonal distribution of the image that is associated with a darkness-based mapping of a plurality of pixels of the image, and a plurality of spatial frequencies of the image that are associated with a visual transition between adjacent pixels of the image. The operations further include classifying a quality of the image based at least in part on the analyzed characteristics of the image, and, when the quality of the image is classified as poor quality, outputting a notification that the image is a poor quality image.

In another example, a device includes at least one processor, at least one camera operable by the at least one processor to capture an image, and an image quality module operable by the at least one processor to determine whether the image includes a representation of at least a portion of a face, and when the image includes the representation of at least the portion of the face, to analyze characteristics of the image, the characteristics including at least one of a tonal distribution of the image that is associated with a darkness-based mapping of a plurality of pixels of the image, and a plurality of spatial frequencies of the image that are associated with a visual transition between adjacent pixels of the image, and to classify a quality of the image based at least in part on the analyzed characteristics of the image.

The details of one or more examples are set forth in the accompanying drawings and the description below. Other features, objects, and advantages will be apparent from the description and drawings, and from the claims.

DETAILED DESCRIPTION

In general, the present disclosure is directed to techniques for evaluating the quality of images captured during enrollment and authentication when using facial recognition authentication mechanisms. Facial recognition authentication typically fails in two basic ways: 1) the current user is an authorized user, but the device fails to authenticate the current user, or 2) the current user is not an authorized user, but the device grants access to the current user as if he/she is an authorized user. Either of the authentication failures may result from poor quality enrollment and/or authentication image captures.

Techniques of the present disclosure may reduce the frequency of facial recognition authentication failures by identifying image captures of low quality, alerting the user, and refraining from performing facial recognition authentication or completing enrollment until images of satisfactory quality have been captured. In particular, techniques of the present disclosure may identify image quality issues resulting from poor lighting conditions. For example, when a mobile computing device captures an image of a person's face, the mobile computing device may analyze the tonal distribution of the captured image. A tonal distribution may be a darkness-based mapping or plotting of the pixels in the captured image. The mobile computing device may generate a set of numerical vectors that each include a percentage of pixels that fall within a specified range of the histogram. The vectors may then be compared to vectors that correspond to properly lit images and improperly lit images. Based on the comparison, the mobile computing device may categorize the image as a good quality image or a poor quality image. If the image is a good quality image, the mobile computing device may proceed with the facial recognition enrollment or authentication process. If, however, the image is a poor quality image, the mobile computing device may notify the user of the problem and provide suggestions as to how to improve the quality of the image before capturing another image.

As another example, techniques of this disclosure may identify poor image quality based at least in part on an amount of motion blur of a captured image. To determine an amount of motion blur, the mobile computing device may analyze the spatial frequencies of a captured image, compute localized spatial frequencies within the image, and analyze the computed spatial frequencies. A spatial frequency may represent a transition (e.g., a contrast) between two or more adjacent pixels of the captured image. When an image is blurred, the computed frequencies will include fewer occurrences of high frequencies than when the image is in focus.

Techniques of this disclosure may be implemented by computing devices with various levels of processing capabilities. Image characteristics such as tonal distributions and spatial frequencies may be computed with relatively low expenditure of power and computing resources. As a result, low-power devices and devices with weaker processing power, such as mobile phones, may implement the techniques with little or no compromise with respect to the devices' remaining functions and battery life.

Figure 1A:
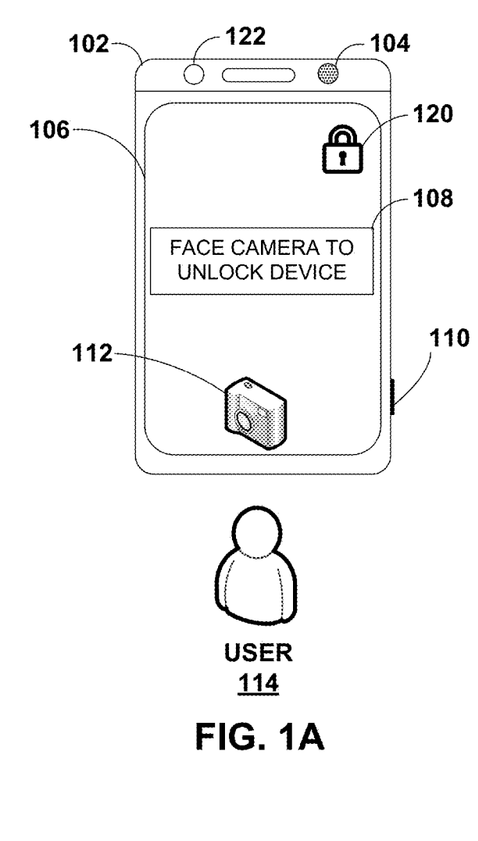
FIGS. 1A-1B are conceptual diagrams illustrating an example computing device that may be used to assess the quality of captured facial images, in accordance with one or more aspects of the present disclosure.
Figure 1B:
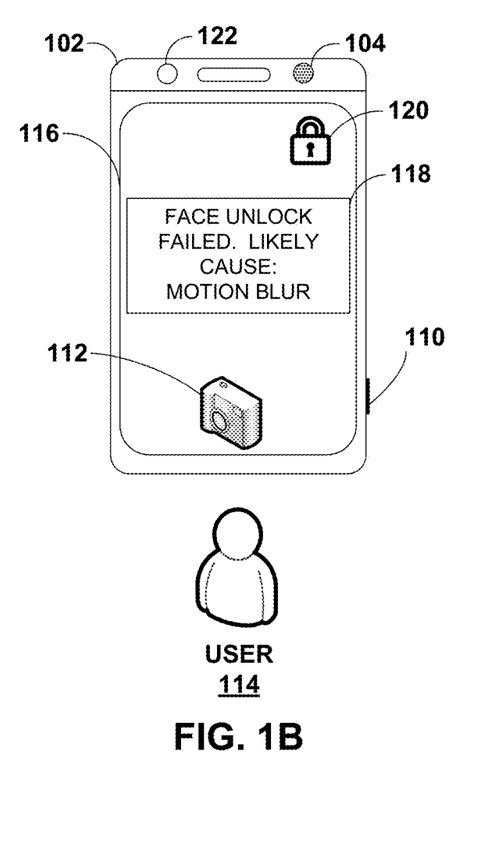

FIGS. 1A and 1B are conceptual diagrams illustrating an example computing device that may be used to assess the quality of captured facial images, in accordance with one or more aspects of the present disclosure. FIG. 1A illustrates computing device 102 that may capture a facial image associated with user 114, assess the quality of the captured facial image, and output a response based on the assessed quality. Computing device 102 may include, be, or be part of one or more of a variety of types of devices, such as a mobile phone (including a smartphone), tablet computer, netbook, laptop, desktop, personal digital assistant ("PDA"), set-top box, television, and watch, among others.

Computing device 102 may include camera lens 104 and flashbulb 122. In the example of FIG. 1A, both camera lens 104 and flashbulb 122 may be part of or coupled to a front-facing camera of computing device 102. In other examples, one or both of camera lens 104 and flashbulb 122 may be part of or coupled to a rear-facing camera of computing device 102. One or both of the front-facing and rear-facing cameras may be capable of capturing still images, video, or both. In still other examples, camera lens 104 and flashbulb 122 may be integrated to form a single component of computing device 102.

In the example of FIG. 1A, computing device 102 may include a display device that displays graphical user interface (GUI) 106. GUI 106 may be displayed by a variety of display devices, including input/output capable devices such as a touchscreen or presence-sensitive display. As shown in the example of FIG. 1A, GUI 106 may include one or more GUI elements, such as lock indicator 120, unlock prompt 108, and capture icon 112.

Computing device 102 may be configured to operate in a "locked" mode, shown by lock indicator 120. In some examples, a user may actively configure computing device 102 to operate in locked mode. For example, a user may press a button (e.g., button 110) for a predetermined length of time to configure computing device 102 to operate in locked mode. In these and other examples, a user may tap, swipe, or otherwise interact with one or more elements of GUI 106, using an input/output capable display of computing device 102. Computing device 102 may also be configured to operate in locked mode by passive means. For example, a predetermined period of "inactivity" may configure computing device 102 to operate in locked mode. Inactivity may occur due to an absence of user interaction (e.g., through button presses, contact with an input/output capable display device, etc.). The predetermined time period that configures computing device 102 to operate in locked mode may be a default time period specified by a manufacturer of computing device 102, or may be programmed by an authorized user, such as user 114.

In some examples, computing device 102 may utilize facial recognition technology to stop operation locked mode. In other words, user 114 may "unlock" computing device 102 by authentication methods that use facial recognition techniques to determine whether user 114 is an authorized user of device 102. More specifically, user 114 may set up a facial recognition application or embedded process of computing device 102 by storing one or more enrollment images that represent the face of user 114. User 114 may cause a camera of computing device 102 to capture the authentication using camera lens 104. Computing device 102 may store the enrollment images to one or more storage devices of computing device 102, and/or to a remote location, commonly known as "cloud storage."

To unlock computing device 102 using facial recognition technology, user 114 may provide an authentication image that represents at least a portion of his/her face. In some examples, user 114 may actively cause a camera of computing device 102 to capture the authentication image. For example, user 114 may face camera lens 104 and press button 110 to cause the camera to capture the authentication image. In another example, user 114 may tap, swipe, or otherwise interact with an area associated with capture icon 112 included in GUI 106. In still other examples, computing device 102 may automatically capture the authentication image in response to user 114 facing camera lens 104. As shown in the example of FIG. 1A, computing device 102 may display GUI 106 to include unlock prompt 108. In this example, unlock prompt 108 indicates that user 114 may simply face a camera, which may include or be otherwise coupled to camera lens 104, to cause computing device 102 to capture the authentication image. For example, when user 114 faces camera lens 104, computing device 102 may use a facial recognition program to determine that the image currently captured through camera lens 104 includes a representation of a human face.

Computing device 102 may then compare the captured authentication image with the enrollment image, and determine whether or not the images are sufficiently similar to each other for facial recognition purposes. For example, computing device 102 may utilize one or more facial recognition programs to compare metrics associated with the authentication image to metrics associated with the enrollment images. Some examples of metrics may include distances between facial elements (pupil-to-pupil, mouth width, etc.), contours of various facial features, pixilation corresponding to skin tone or texture, hair and/or eye color, and many others. Facial recognition programs running on computing device 102 may perform the comparison using one or more well-known recognition algorithms, such as geometric and/or photometric approaches, three-dimensional (3D) modeling and recognition techniques, principal component analysis using eigenfaces, linear discriminate analysis, elastic bunch graph matching, pattern matching, and dynamic link matching, to name just a few. Based on comparison-based values, such as preprogrammed acceptable margins of error, facial recognition programs running on computing device 102 may determine whether or not the authentication image and the enrollment image are sufficiently similar to one another for facial recognition. In instances where the facial recognition programs grant a match, user 114 may successfully unlock computing device 102. Conversely, if the facial recognition programs deny a match, user 114 may be unable to unlock computing device 102, and computing device 102 may continue to operate in locked mode.

However, authentication by facial recognition may not function as intended in some instances. For example, conditions such as overexposure, poor lighting, or motion blur may cause authentication by facial recognition to fail. As discussed, an example of such a failure is denying user 114 a match even where user 114 is an authorized user (e.g., at least one enrollment image includes a representation of the face of user 114). Another example of such a failure is granting user 114 a match where user 114 is not an authorized user (e.g., none of the enrollment images includes a representation of the face of user 114). Computing device 102 may implement techniques of the present disclosure to determine whether an authentication image is of good or poor quality. Additionally, if computing device 102 determines that an authentication image is of poor quality, computing device 102 may implement techniques of the present disclosure to output a response to user 114 indicating one or more conditions that may have caused and/or contributed to the poor quality image and consequent failure of the facial recognition program.

FIG. 1B is a conceptual diagram that illustrates the behavior of computing device 102 after user 114 attempts to unlock computing device 102 by use of facial recognition technology. In the specific example of FIG. 1B, user 114 is unable to authenticate by facial recognition, most likely due to movement of user 114 and/or computing device 102 during capture of the authentication image (a condition known as "motion blur"). In this example, user 114 may be assumed to be an authorized user (e.g., at least one enrollment image stored by computing device 102 includes a representation of the face of user 114). After computing device 102 denies user 114 a match (e.g., user 114 fails to authenticate by facial recognition), computing device 102 may display failure notification 118 within GUI 116. In this example, failure notification 118 indicates that the likely reason that user 114 failed to authenticate by facial recognition is motion blur.

As discussed, physical movement by user 114 and/or computing device 102 during capture of the authentication image may cause the authentication image to be blurred or otherwise obscured. Computing device 102 may detect motion blur in a variety of ways. In one example, computing device 102 may begin by determining whether the captured authentication image includes a representation of a face. If computing device 102 detects a representation of a face, computing device 102 may utilize the one or more facial recognition programs running on computing device 102 to match the authentication image to one or more stored enrollment images. To reduce the occurrence of errors by the facial recognition programs, computing device 102 may first inspect the authentication image for one or more characteristics that may contribute to such errors. For example, computing device 102 may inspect the authentication image for characteristics that are symptomatic of motion blur.

Low spatial frequencies may be characteristic of motion blur. Spatial frequencies may, in some instances, be discerned from color transitions between adjacent pixels. For example, if a white pixel is located adjacent to a black pixel, the transition between the two pixels may represent a maximum spatial frequency (e.g., 1.0). On the other hand, if two white pixels are located adjacent to each other, the transition between the two pixels may represent a minimum spatial frequency (e.g., 0.0). If two adjacent pixels are of similar, yet not identical, shades of beige, the transition between the pixels may represent a low spatial frequency (e.g., 0.1). To detect motion blur, computing device 102 may identify various target regions of the captured authentication message. Examples of target regions may include a hairline within the detected facial representation, ocular areas (including the iris areas) of the detected facial representation, and borders between the detected facial representation and background areas of the authentication image, among others. Computing device 102 may set threshold spatial frequencies for each target region (e.g., 0.7 for the iris of the ocular area). If the spatial frequencies of one or more target regions fall below the corresponding thresholds, computing device 102 may identify motion blur as the likely cause of the poor quality of the authentication image. Computing device 102 may then output a notification that indicates the likely cause, such as failure notification 118.

In other examples, computing device 102 may identify causes, other than motion blur, that likely caused the poor quality of the authentication image. Some examples of such causes include overexposure and backlighting. Overexposure and backlighting may be related to improper lighting conditions in the environment surrounding user 114 and computing device 102. For example, when an excessive amount of light falls on the face of user 114, the authentication image may be overexposed. In some examples, the authentication image may be overexposed due to large amounts of ambient sunlight or man-made light in the environment of user 114. In many such cases, the light may emanate from sources that are substantially behind computing device 102, from the point of view of user 114. In other examples, the light may emanate from computing device 102 (e.g. from flashbulb 122).

Computing device 102 may identify overexposure as the likely cause of authentication failure based on a tonal distribution of the captured authentication image. In some examples, computing device 102 may construct a histogram that shows the tonal distribution, ranged by tonal values associated with the pixels. A tonal value may indicate how light or dark the color of a pixel is. With increasing tonal value, pixels may be lighter in color. For example, pixels with low tonal values (e.g., black pixels) may be represented towards the left side of the x-axis (i.e., the horizontal axis) of the histogram, and progressively higher tonal values may be represented while moving right along the x-axis. The number of pixels for a given tonal value may be represented along the y-axis (i.e., the vertical axis) of the histogram.

Computing device 102 may compare the constructed histogram to two or more calibration histograms. In an example where computing device 102 utilizes exactly three calibration histograms, each calibration histogram may represent tonal distributions corresponding to overexposed, acceptable quality, and backlit images, respectively. Computing device 102 may identify a calibration histogram that is "nearest matching" to the constructed histogram. In the example of an overexposed authentication image, computing device 102 may identify the calibration histogram representing an overexposed image to be the nearest matching calibration histogram. Computing device 102 may then cause modified GUI 116 to display a notification similar to failure notification 118. In this example, the failure notification may identify the likely cause of authentication failure as overexposure.

When the failure is due to overexposure and flashbulb 122 is configured to activate in all situations, computing device 122 may cause the failure notification to include a message advising user 114 to deactivate flashbulb 122. In another example, computing device 102 may automatically deactivate flashbulb 122 in response to an overexposed authentication image, and output a failure message advising user 114 to capture and submit another authentication image by way of camera lens 104. Similarly, computing device 102 may output a failure message advising user 114 to position himself/herself to face away from a source of ambient light.

For purposes of ease of illustration, FIGS. 1A-B are described with respect to authentication images that user 114 may input to unlock computing device 102. However, the techniques of the present disclosure may be implemented with respect to enrollment images as well. As discussed, when configuring one or more facial recognition programs installed on computing device 102, user 114 and others may provide enrollment images. In some examples, computing device 102 may compare an enrollment image to the calibration histograms. For example, computing device 102 may identify the calibration histogram corresponding to a backlit image as being nearest matching to the tonal distribution of a captured enrollment image. In this example, computing device 102 may display a failure notification that identifies backlighting as the likely cause of identifying the enrollment image as having poor quality. Computing device 102 may also cause the notification to include a message advising user 114 to reposition such that the ambient light source is not directly behind user 114.

Figure 2:
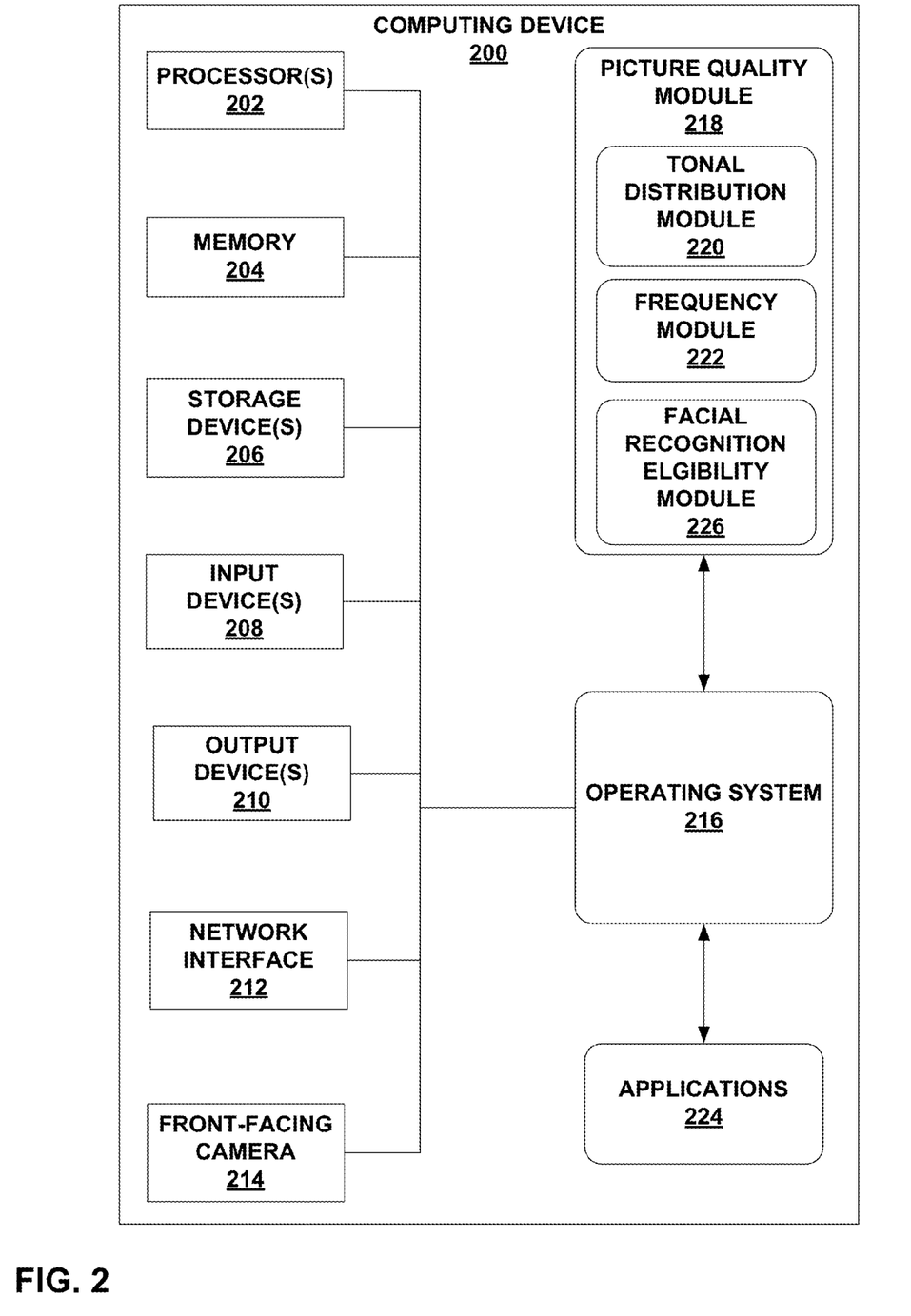
FIG. 2 is a block diagram illustrating details of an example computing device that may be used to assess the quality of captured facial images, in accordance with one or more aspects of this disclosure.

FIG. 2 is a block diagram illustrating details of an example computing device that may be used to assess the quality of captured facial images, in accordance with one or more aspects of this disclosure. Computing device 200 may be one non-limiting example of computing device 102 of FIGS. 1A-B. As shown in the example of FIG. 2, computing device 200 includes one or more processors 202, memory 204, one or more storage devices 206, one or more input devices 208, one or more output devices 210, network interface 212, and front-facing camera 214. One or more processors 202 are, in some examples, configured to implement functionality and/or process instructions for execution within computing device 200. For example, processors 202 may process instructions stored in memory 204 and/or instructions stored on storage devices 206. Such instructions may include components of operating system 216, picture quality module 218, tonal distribution module 220, frequency module 222, and one or more applications 224. Computing device 200 may also include one or more additional components not shown in FIG. 2, such as a power supply (e.g., a battery), a global positioning system (GPS) receiver, and a radio frequency identification (RFID) reader, among others.

Memory 204, in one example, is configured to store information within computing device 200 during operation. Memory 204, in some examples, is described as a computer-readable storage medium. In various examples, memory 204 may also be described as one or more of a tangible computer-readable storage medium, a non-transitory computer-readable storage medium, and a computer-readable storage device. In some examples, memory 204 is a temporary memory, meaning that a primary purpose of memory 204 may not be long-term storage. Memory 204, in some examples, is described as a volatile memory, meaning that memory 204 does not maintain stored contents when memory 204 is not receiving power. Examples of volatile memories include random access memories (RAM), dynamic random access memories (DRAM), static random access memories (SRAM), and other forms of volatile memories known in the art. In some examples, memory 204 is used to store program instructions for execution by processors 202. Memory 204, in one example, is used by software (e.g., operating system 216) or applications (e.g., one or more applications 224) executing on computing device 200 to temporarily store information during program execution.

One or more storage devices 206, in some examples, also include one or more computer-readable storage media. In some examples, storage devices 206 may be configured to store greater amounts of information than memory 204. Storage devices 206 may further be configured for long-term storage of information. In some examples, storage devices 206 include non-volatile storage elements. Examples of such non-volatile storage elements include magnetic hard discs, optical discs, solid state discs, floppy discs, flash memories, forms of electrically programmable memories (EPROM) or electrically erasable and programmable memories, and other forms of non-volatile memories known in the art.

As shown in FIG. 2, computing device 200 may also include one or more input devices 208. One or more of input devices 208 may be configured to receive input from a user through tactile, audio, video, or biometric channels. Examples of input devices 208 may include a keyboard, mouse, touchscreen, presence-sensitive display, microphone, one or more still and/or video cameras, fingerprint reader, retina scanner, or any other device capable of detecting an input from a user or other source, and relaying the input to computing device 200, or components thereof. Though shown separately in FIG. 2, front-facing camera 214 may, in some instances, be part of input devices 208.

Output devices 210 of computing device 200, in some examples, may be configured to provide output to a user through visual, auditory, or tactile channels. Output devices 210 may include a video graphics adapter card, a liquid crystal display (LCD) monitor, a light emitting diode (LED) monitor, a cathode ray tube (CRT) monitor, a sound card, a speaker, or any other device capable of generating output that may be intelligible to a user. Output devices 210 may also include a touchscreen, presence-sensitive display, or other input/output capable displays known in the art.

Computing device 200, in some examples, also includes network interface 212. Computing device 200, in one example, utilizes network interface 212 to communicate with external devices via one or more networks, such as one or more wireless networks. Network interface 212 may be a network interface card, such as an Ethernet card, an optical transceiver, a radio frequency transceiver, or any other type of device that can send and receive information. Other examples of such network interfaces may include Bluetooth®, 3G, 4G, and WiFi® radios in mobile computing devices as well as USB. In some examples, computing device 200 utilizes network interface 212 to wirelessly communicate with external devices over a network.

Operating system 216 may control one or more functionalities of computing device 200 and/or components thereof. For example, operating system 216 may interact with applications 224, and may facilitate one or more interactions between applications 224 and one or more of processors 202, memory 204, storage devices 206, input devices 208, and output devices 210. As shown in FIG. 2, operating system 216 may interact with or be otherwise coupled to applications 224 and picture quality module 218 and components thereof. In some examples, one or more of picture quality module 218, tonal distribution module 220, and frequency module 222 may be included in operating system 216. In these and other examples, one or more of picture quality module 218, tonal distribution module 220, and frequency module 222 may be part of applications 224. In other examples, one or more of picture quality module 218, tonal distribution module 220, and frequency module 222 may be implemented externally to computing device 200, such as at a network location. In some such instances, computing device 200 may use network interface 212 to access and implement functionalities provided by picture quality module 218 and its components, through methods commonly known as "cloud computing."

Picture quality module 218 may implement one or more techniques described in the present disclosure. For example, picture quality module 218 may assess an enrollment image and/or authentication image captured by front-facing camera 214 to determine image quality. A quality determination by picture quality module 218 may classify an enrollment image and/or authentication image as having "good quality" or "poor quality." In cases of a poor quality image, picture quality module 218 may utilize tonal distribution module 220 and/or frequency module 222 to further determine one or more likely causes of the poor quality.

For example, tonal distribution module 220 may be operable to extrapolate and assess information related to lighting conditions surrounding the captured image. More specifically, tonal distribution module 220 may analyze a tonal distribution of the captured image. In some examples, tonal distribution module 220 may construct a statistical representation, such as a histogram, that expresses the tonal distribution based on "tonal values" of the pixels. Tonal distribution module 220 may then use the histogram to analyze the expressed tonal distribution. Pixels of the captured image may exhibit different "tonal values." A tonal value may represent how light or how dark a pixel is, based on the color of the pixel. On the basis of the tonal distribution, tonal distribution module 220 may construe intensities associated with light and dark pixels (e.g., by computing the area under the curve associated with light and dark pixels). Tonal distribution module 220 may then compute a ratio of light pixels to dark pixels (e.g., by comparing their respective densities). In an example where the ratio is significantly biased in favor or light pixels, tonal distribution module 220 may determine the likely cause of poor quality to be "overexposure." In a converse example where the ratio is significantly biased in favor of dark pixels, tonal distribution module 220 may determine the likely cause of poor quality to be "backlighting." Picture quality module 218 may then output a notification that indicates the assessment of poor quality, and the likely cause determined by tonal distribution module 220, through one or more of output devices 210.

In another example of assessment of poor quality, frequency module 222 may be operable to extrapolate and assess information related to motion-related conditions surrounding the captured image. In examples, frequency module 222 may identify one or more target regions of the captured image, and extrapolate spatial frequencies associated with the target regions. For example, frequency module 222 may identify a target region that includes a hairline of an identified face in the captured image. In this example, frequency module 222 may extrapolate spatial frequencies associated with the target region by measuring color transitions (e.g., "contrast") between adjacent pixels in the target region. Upon measuring the color transitions, frequency module 222 may calculate an average value of the transitions, such as a mean, median, or mode, among others. Based on the calculated average, frequency module 222 may determine an overall spatial frequency, or "frequency representation" associated with the target region. If the frequency representation is lower in value than a preprogrammed threshold value, frequency module 222 may determine that the likely cause of the poor quality assessment is motion blur. Picture quality module 218 may then output a notification that indicates the assessment of poor quality, and the likely cause determined by frequency module 222, through one or more of output devices 210.

Picture quality module 218 and components thereof may also be operable to determine whether or not a captured image includes a representation of a human face. For example, facial recognition eligibility module 226 may implement one or more facial detection and/or recognition techniques to detect a representation of a human face in the captured image. In various other examples, picture quality module 218 may itself determine whether a captured image includes a representation of a face, or one or both of tonal distribution module 220 and frequency module 222 may be operable to determine whether a captured image includes a representation of a face. By determining whether a captured image includes a representation of a human face, picture quality module 218 may eliminate instances where tonal distribution module 220 and/or frequency module 222 unnecessarily assess images that are ineligible for facial recognition.

Figure 3A:
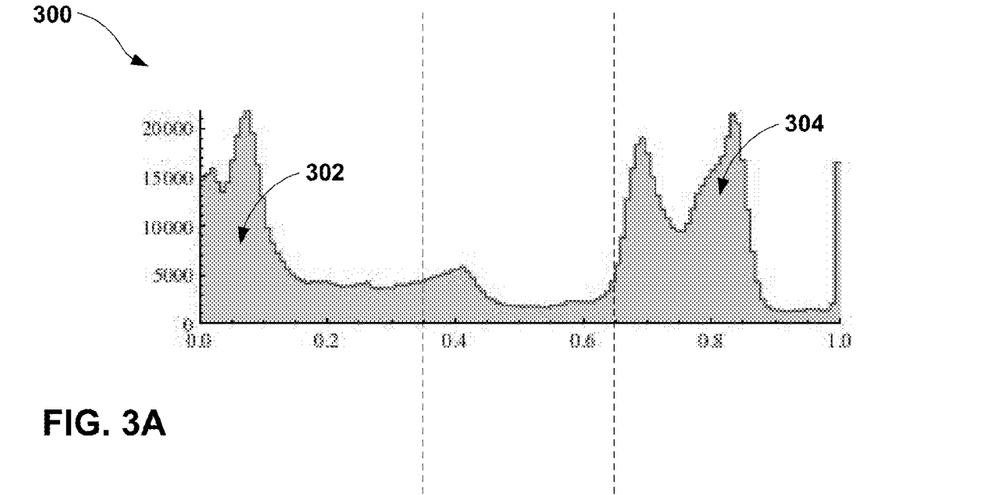
FIG. 3A is an example histogram illustrating a tonal distribution of a good quality facial image, in accordance with one or more aspects of this disclosure.
Figure 3B:
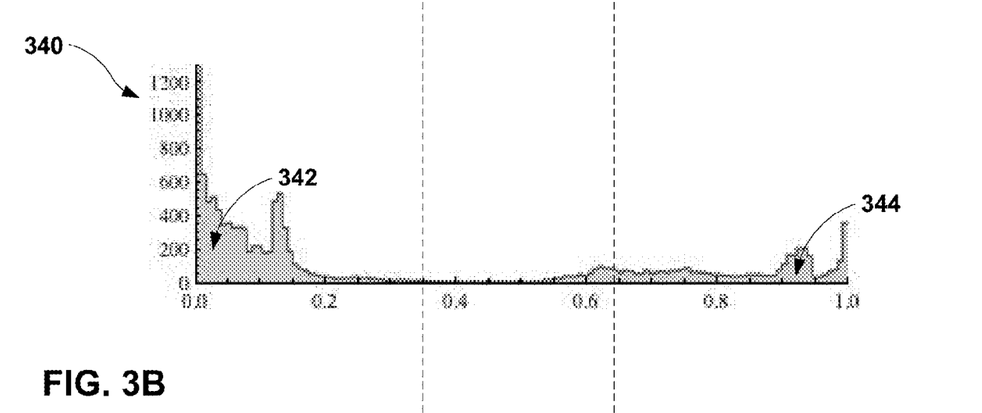
FIG. 3B is an example histogram illustrating a tonal distribution of a facial image with excess backlighting, in accordance with one or more aspects of this disclosure.
Figure 3C:
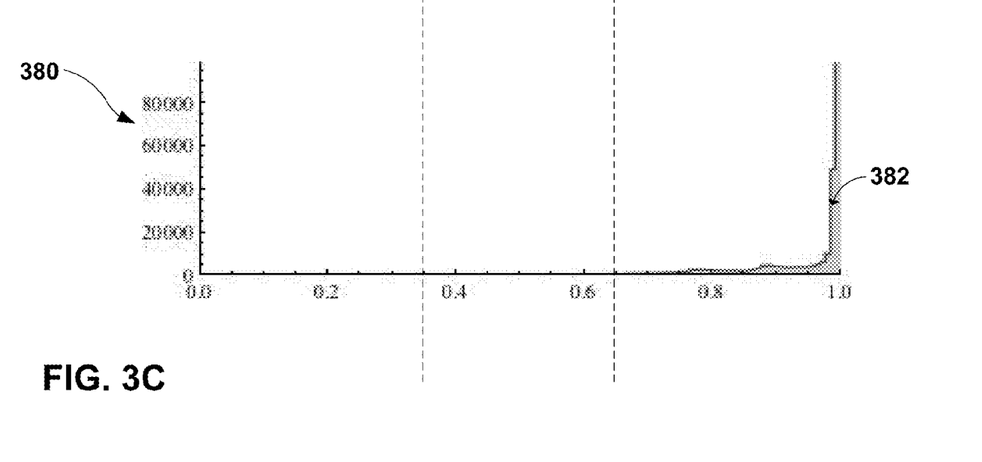
FIG. 3C is an example histogram illustrating a tonal distribution of an overexposed facial image, in accordance with one or more aspects of this disclosure.

FIGS. 3A-C are example histograms illustrating tonal distributions of a good quality facial image, a facial image with excess back-lighting, and an overexposed facial image, respectively. Though FIGS. 3A-C are described in terms of histograms, a computing device in accordance with this disclosure may express tonal distributions using any type of statistical representation, such as mixture models and other statistical representations known in the art. The x-axis of each histogram may represent or be otherwise associated with tonal values included in a facial image, while the y-axis may reflect the number of pixels in the facial image that correspond to each tonal value. Any transition along the x-axis may be referred to as a "tonal variation" as the x-axis represents varying tonal values.

FIG. 3A is an example histogram illustrating a tonal distribution of a good quality facial image, in accordance with one or more aspects of this disclosure. More specifically, good quality histogram 300 may represent a tonal distribution of a facial image that is assessed to have "good quality". Backlit histogram 340 of FIG. 3B and overexposed histogram 380 of FIG. 3C, meanwhile, may represent tonal distributions of facial images that are assessed to have "poor quality." A facial image used for facial recognition purposes may be deemed to possess good quality or poor quality based on certain metrics. Examples of these metrics include luminance, sharpness, flare, noise, distortion, tone reproduction, blurring, and contrast. Contrast, for example, may be measured by calculating ratios between a number of light pixels and a number of dark pixels in the facial image. In the example of FIGS. 3A-3C, dark pixels may be those pixels represented by values of 0.35 and below on the x-axis, while light pixels may be those pixels represented by values of 0.65 and above on the x-axis.

In the example of FIG. 3A, good quality histogram 300 includes dark region 302 that may represent a total number of dark pixels and light region 304 that represents a total number of light pixels in a facial image. In some examples, the ratio between light region 304 and dark region 302 may be deemed to constitute a tonal distribution of a "good quality image." In these and other examples, good quality histogram 300 may be compared to two or more calibration histograms, where each calibration histogram illustrates a tonal distribution of a good quality and a poor quality facial image, respectively.

Techniques of the present disclosure may enable a computing device (e.g., computing device 102 of FIGS. 1A-B) to identify one of the calibration histograms as being "nearest matching" to good quality histogram 300. For example, the computing device may superimpose good quality histogram 300 on each calibration histogram, and determine overlap percentages in each case. The overlap percentage may be determined by areas of commonly shaded regions. For example, good quality histogram 300 may have a nearest match with a calibration histogram that represents a good quality image. In other words, light region 304 and dark region 302 may overlap significantly with corresponding regions of the calibration histogram representing a good quality image. If the percentage of overlapping area between good quality histogram 300 and the calibration histogram representing a good quality image is higher than the percentages of overlapping area between good quality histogram 300 and the remaining calibration histograms, the computing device may identify the calibration histogram representing the good quality image as the nearest match, and classify the facial image represented by good quality histogram 300 as being of good quality.

In examples, certain features of good quality histogram 300 may be characteristic of good quality facial images, in general. For example, light region 304 and dark region 302 may be considered to cover comparable areas. Because light region 304 and dark region 302 cover comparable areas, the facial image represented by good quality histogram 300 may be considered to include comparable amounts of light pixels and dark pixels, or a "substantially even ratio." In certain scenarios, a substantially even ratio of light pixels to dark pixels may indicate that the facial image includes sufficient contrasts to be classified as "good quality." More specifically, the sufficient contrasts indicated by the substantially even ratio may be characteristic of good lighting conditions under which the computing device captured the facial image.

In some examples, the computing device may implement techniques of this disclosure to compare good quality histogram 300 to various sets of calibration histograms, where each set of calibration histograms corresponds to a predefined quality level and/or type of facial image. For example, the computing device may compare good quality histogram 300 to a set of calibration histograms that represent tonal distributions of various facial images assessed to possess good quality. Similarly, the computing device may compare good quality histogram 300 to a set of calibration histograms that represent tonal distributions of various facial images assessed to possess poor quality. In some instances, the computing device may generate standard deviations between good quality histogram 300 and each set of calibration histograms. The computing device may then classify good quality histogram 300 according to the lowest standard deviation generated. In the example of good quality histogram 300, the lower standard deviation is presumed to be with the set of calibration histograms that represent tonal distributions of facial images assessed to possess good quality. In this manner, techniques of this disclosure may enable a computing device to more robustly classify a captured image as having good quality or poor quality.

FIG. 3B is an example histogram illustrating a tonal distribution of a facial image with excess backlighting, in accordance with one or more aspects of this disclosure. Backlit histogram 340 exhibits a tonal ratio that may be characteristic of backlit facial images, in general. Backlit conditions, or backlighting, may be one example cause for a captured facial image to be classified as having poor quality. Backlighting may occur when an excessive amount of light emanates from behind the user, and falls on the camera lens or other interface of the computing device. Backlighting may overwhelm the amount of light falling on the user's face, causing the facial image to be dark and making the facial features indistinguishable to a facial recognition program. Similar to good quality histogram 300, backlit histogram 340 includes dark region 342 and light region 344. However, in the case of backlit histogram 340, dark region 342 may be considered to cover a significantly greater area than light region 344. In the case of backlit histogram 340, the ratio of dark-colored pixels to light-colored pixels may be considered to be "dark-biased." A dark-biased pixel ratio may be symptomatic of backlit facial images, e.g. facial images where an excessive amount of light emanates from behind the face of the user while the computing device captures the facial image. As discussed, the excessive light may emanate from various sources, including ambient light sources such as naturally occurring light, man-made light, and others. In this manner, techniques of the present disclosure may enable a computing device to identify overexposure as a likely cause of a poor quality facial image.

FIG. 3C is an example histogram illustrating a tonal distribution of an overexposed facial image, in accordance with one or more aspects of this disclosure. Overexposed histogram 380 exhibits a tonal ratio that may be characteristic of a poor quality image caused by a condition commonly known as overexposure. Overexposure may occur when an excessive amount of light falls on the face of the user. As discussed, the excessive light may emanate from various sources, such as ambient light sources, a flashbulb coupled to the computing device, and others. Overexposure may overwhelm the contrasts between facial features in the facial image; a concept commonly known as "washing out" of the facial image. Due to the loss of contrast, the facial features of the facial image may become indistinguishable to a facial recognition program. Overexposed histogram 380 illustrates a tonal distribution which may be considered "light-biased." More specifically, overexposed histogram 380 includes light region 382, but does not include a corresponding dark region. A light-biased tonal distribution may be characteristic of an overexposed facial image. In this manner, techniques of the present disclosure may enable a computing device to classify a captured facial image as having poor quality, based on detecting overexposure of the captured facial image.

While FIGS. 3A-3C have been described with respect to comparing overlapping areas of histograms, a computing device may implement techniques of this disclosure to compare tonal distributions in various other ways. For example, the computing device may compare overexposed histogram 380 to two or more calibration histograms by calculating a vector distance between overexposed histogram and each calibration histogram. Calculation of vector distances is well-known in the art, and may be accomplished using such formulae as the Minkowski form distance, Euclidean distance, Manhattan distance, and O(n) functions.

Consistent with the techniques of this disclosure, another alternative method of comparing histograms may include extracting one or more scalar values from each histogram to be compared, and drawing a comparison between the scalar values. For example, a computing device implementing the techniques may extract well-known scalar values such as a peak count, variance, and entropy from good quality histogram 300, backlit histogram 340, and overexposed histogram 380. The computing device may then compare the extracted scalar values to corresponding scalar values extracted from two or more calibration histograms. For example, the peak counts (number of upward-facing apexes and/or plateaus) of backlit histogram 340 and overexposed histogram 380 may fall below the peak count of one or more calibration histograms representing a facial image assessed to have good quality. However, the peak count of good quality histogram 300 may meet or exceed the peak count of the calibration histograms representing a facial image assessed to have good quality. Similarly, the computing device may use entropy (sometimes liked to a rate of change of peak heights) and/or variance (a square of the standard deviation displayed by the points plotted in a histogram) to compare any of good quality histogram 300, backlit histogram 340, and overexposed histogram 380 to the calibration histograms.

Figure 4:
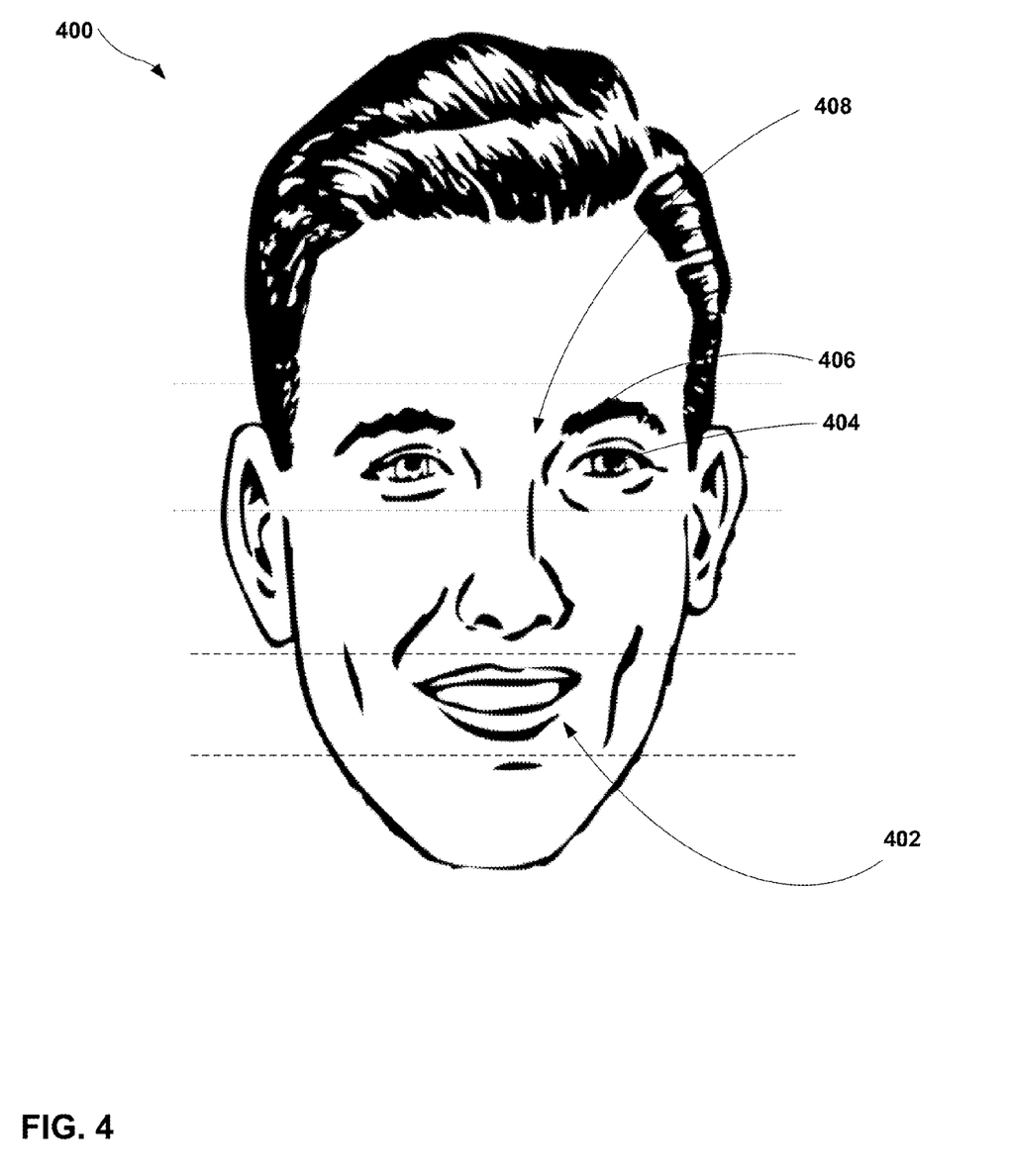
FIG. 4 is a conceptual diagram illustrating an example facial image including target regions identified by a computing device for assessing the presence and/or level of motion blur, in accordance with one or more aspects of the present disclosure.

FIG. 4 is a conceptual diagram illustrating an example facial image including target regions identified by a computing device for assessing the presence and/or level of motion blur, in accordance with one or more aspects of the present disclosure. Facial image 400 may be an example of an enrollment image or an authentication image, as the case may be. As discussed, an example cause for a facial image to be classified as poor quality may be the presence of motion blur. Motion blur may occur when a user and/or capturing computing device experiences physical movement while a facial image is captured.

A computing device (e.g., computing device 102 of FIGS. 1A-1B) may implement the techniques of the present disclosure to identify one or more target regions within facial image 400 and analyze "frequency representations" of each target regions. In this manner, the computing device may classify facial image 400 as having poor quality, based on characteristics that are symptomatic of an unacceptable level of motion blur.

In the specific example of FIG. 4, the computing device may identify two target regions, namely mouth region 402 and ocular strip 408. Mouth region 402 and ocular strip 408 are each demarcated by distinct dashed-line borders. For purposes of ease of illustration, FIG. 4 illustrates an example of two target regions. In operation, techniques of the present disclosure may enable a computing device to identify a large number of target regions within a facial image. For example, a computing device may identify and analyze target regions associated with nasal, hairline, and ear regions, among others.

In some examples, the computing device may extrapolate a frequency representation associated with mouth region 402 in order to determine whether facial image 400 is affected by motion blur. More specifically, the computing device may collect one or more "spatial frequencies" within mouth region 402. A spatial frequency may be a value derived from a contrast between two or more adjacent pixels. For example, a spatial frequency may have a highest possible value (e.g., 1.0) when derived from the contrast between a white pixel and a neighboring black pixel. Similarly, a spatial frequency may have a relatively low value (e.g., 0.2) when derived from the contrast between a dark blue pixel and a neighboring black pixel. Similarly, a spatial frequency may have a lowest possible value (e.g., 0.0) when derived from the contrast between two neighboring pixels which both share an identical shade of red.

As shown in the specific example of FIG. 4, mouth region 402 may include several instances of high spatial frequency. More specifically, mouth region 402 includes, in this example, a visible contrast between the skin color of the areas surrounding the lips and the color of the lips. In some examples, the computing device may identify mouth region 402 as a target region based on such contrasts. The computing device may then extrapolate a frequency representation associated with mouth region 402. In some examples, the computing device may measure all spatial frequencies included in mouth region 402. In one such example, the computing device may then eliminate all spatial frequencies that are very low (e.g. <0.1). By eliminating very low spatial frequencies, the computing device may remove from consideration all contrasts within the forehead area alone, and/or within the scalp area alone.

With the remaining spatial frequencies measured from mouth region 402, the computing device may construct a "frequency representation" associated with mouth region 402. The computing device may then compare the constructed frequency representation with a threshold frequency representation. If the constructed frequency representation favors high spatial frequencies to an equal or greater degree than does the threshold frequency representation, the computing device may determine that facial image 400 does not include motion blur. Frequency representations may exhibit "energies" in different regions, and each region may also be known as a "band." By stating that a frequency representation favors higher spatial frequencies, it may be understood that the frequency representation exhibits higher energy in a high band of spatial frequencies (e.g., 0.7-1.0).

Based on the appearance of facial image 400, the frequency representation of mouth region 402 may include a large proportion of high spatial frequencies (e.g., >0.7) when affected by an acceptable level or less of motion blur. In other words, the frequency representation of facial image 400 may exhibit higher energy in the high frequency band. However, in an instance where facial image 400 is affected by motion blur that exceeds the acceptable level, the frequency representation of mouth region 402 may exhibit higher energy in the low frequency band (e.g., <0.3). More specifically, motion blur may cause poor contrast within mouth region 402, i.e. between the lips and the surrounding areas. Due to the poor contrast within mouth region 402, the frequency representation of mouth region 402 may not exhibit sufficiently high energy in the high frequency band to match or exceed that of the threshold frequency representation. In a case where the frequency representation of mouth region 402 does not display at least equal energy in the high frequency band as does the threshold frequency representation, the computing device may classify facial image 400 as having poor quality, due to an unacceptable level of motion blur.

In some examples, the computing device may detect motion blur by analyzing a target region other than mouth region 402. For example, the computing device may identify ocular strip 408 as a target region to analyze for detecting motion blur. As shown in FIG. 4, ocular strip 408 may include facial elements such as left iris 404 and left eyebrow 406, among several others. In comparison to mouth region 402, ocular strip 408 may include a greater number of facial elements that enable the computing device to detect motion blur. More specifically, the computing device may construct multiple frequency representations for ocular strip 408, including separate frequency representations associated with each of left iris 404 and left eyebrow 406, to name just a few.

For example, the computing device may construct a frequency representation associated with left iris 404. Since left iris 404 is surrounded by a largely white area known as the sclera of the eye, the computing device may compare the frequency representation of left iris 404 to a threshold frequency representation that exhibits higher energy in a very high frequency band (e.g., >0.8). Similarly, the computing device may compare the frequency representation associated with left eyebrow 406 to a threshold frequency representation that exhibits higher energy in the high frequency band (e.g., >0.7). In this manner, the computing device may construct a number of frequency representations associated with ocular strip 408 to compare with a number of (potentially varying) threshold frequency representations, making ocular strip 408 a robust target region by which to analyze facial image 400 for motion blur.

In examples related to mouth region 402, ocular strip 408, or any other target region that the computing device may identify, the computing device may apply one or more approaches to discern energy levels in the constructed frequency representation. One such approach utilizes a function commonly known as a "wavelet transform." The computing device may derive and analyze various types of wavelet transforms, such as continuous, discrete, and complex wavelet transforms, to name just a few. The computing device may derive wavelet transforms from one or more "wavelets" constructed from the measured spatial frequencies. More specifically, each wavelet may represent a frequency content associated with a particular target region. With reference to facial image 400, each frequency content may be considered as localized and/or oriented to a particular target region (e.g., mouth region 402 or ocular strip 408). Each wavelet may represent a distribution of spatial frequencies, and each wavelet may be 2-dimensional, 3-dimensional, or take any form applicable to wavelets commonly known in the art.

In some examples, a computing device may implement techniques of this disclosure to analyze the frequency distribution of facial image 400 as a whole (hereinafter, the "overall frequency representation"). The computing device may analyze the overall frequency representation instead of, or in addition to the spatial frequencies of one or more identified target regions. Taken as a whole, facial image 400 may include a relatively high number of facial elements that may be used to detect motion blur, including those discussed with respect to mouth region 402 and ocular strip 408, as well as nasal, hairline, ear, and other regions. As discussed with respect to specific target regions, the computing device may compare the overall frequency representation to a threshold overall frequency representation. If the computing device determines that the overall frequency representation exhibits lower energy in a particular frequency band (e.g. high or very high frequency bands) than the threshold overall frequency representation, the computing device may classify facial image 400 as poor quality due to possible motion blur.

Figure 5:
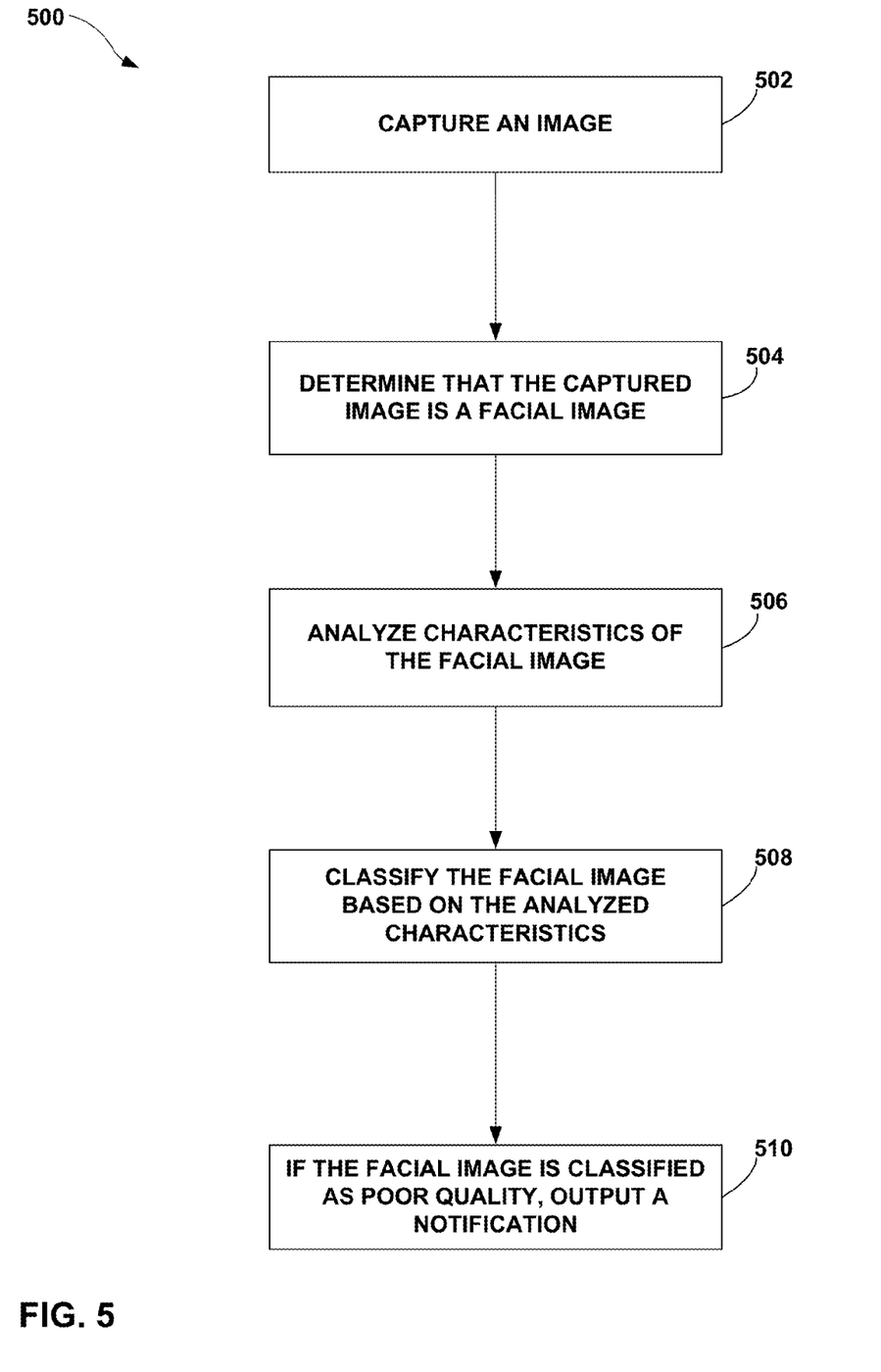
FIG. 5 is a flowchart illustrating an example process that may be performed by a computing device to analyze characteristics of a facial image and determine the quality of the facial image, in accordance with one or more aspects of the present disclosure.

FIG. 5 is a flowchart illustrating an example process that may be performed by a computing device to analyze characteristics of a facial image and classify the facial image based on quality, in accordance with one or more aspects of the present disclosure. Process 500 may be performed by any computing device described in this disclosure. For purposes of ease of illustration only, process 500 is described herein with respect to computing device 102 of FIGS. 1A-1B, in the context of analysis methods described with respect to FIGS. 3-4.

Process 500 may begin when computing device 102 captures an image (e.g., using a camera that includes or is otherwise coupled to camera lens 104) (502). Computing device 102 may then determine that the captured image is a facial image, i.e. that the captured image includes a representation of a human face (504). By determining whether or not the captured image is a facial image, computing device 102 may decide eligibility of the captured image as an enrollment and/or authentication image for use by one or more facial recognition programs installed on computing device 102. If computing device 102 determines that the captured image is an eligible facial image, computing device 102 may perform one or more steps to classify the captured image based on image quality.

Computing device 102 may then analyze one or more characteristics of the facial image (506). Examples of such characteristics may include a tonal distribution and a frequency representation, among others. Computing device 102 may express a tonal distribution as a graphical representation such as a histogram (e.g. backlit histogram 340). Similarly, computing device 102 may express a frequency representation in one or more spectral forms, such as a wavelet transform. In some examples, computing device 102 may analyze multiple frequency representations of the facial image (e.g. each frequency representation being associated with a separate target region within the facial image). Computing device 102 may analyze the tonal distribution to determine light-based characteristics of the facial image, while computing device 102 may analyze the one or more frequency distributions to determine the presence and/or level of motion blur affecting the facial image.

Process 500 may further include computing device 102 classifying the facial image based on the one or more analyzed characteristics (508). For example, computing device 102 may detect one or more instances of motion blur in the facial image, based on one or more wavelet transforms constructed from spatial frequencies included in target regions identified in the facial image. If computing device 102 determines that the constructed spatial frequencies do not exhibit sufficient energy in a high frequency band, computing device 102 may classify the facial image as poor quality. More specifically, the insufficient energy in the high frequency band may indicate motion blur in the facial image, causing computing device 102 to classify the facial image as poor quality. In examples, the insufficient energy in the high frequency band may indicate a condition of poor focus. In examples where computing device 102 identifies poor focus as the cause of the poor quality image, computing device 102 may adjust one or more settings of a camera, or prompt the user to manually adjust the settings.

Computing device 102 may determine whether the frequency representation includes sufficient energy in the high frequency band by comparing the frequency representation to one or more "prototype vectors." In the example of a frequency distribution, a prototype vector may be another frequency representation that was constructed from a previously captured and/or stored image that has an acceptable amount of motion blur. Computing device 102 may compare one or more frequency distributions constructed from the facial image to prototype vectors that define acceptable motion blur amounts for the corresponding target regions. If the energy in a high frequency band is of a lower value than the corresponding value in the prototype vector, computing device 102 may classify the facial image as poor quality. Other examples of prototype vectors may include calibration histograms that represent tonal distributions of good and poor quality images that were previously captured and/or stored by computing device 102.

If the facial image is classified as poor quality, computing device 102 may then output a notification to user 114 (510). Computing device 102 may output the notification as an element of a graphical user interface, or "GUI" (e.g., failure notification 118 of modified GUI 116). In some examples, such as failure notification 118, the notification may include a predicted cause of the poor quality classification. More specifically, if computing device 102 determines that the frequency representation has lower energy in the high frequency band than does a corresponding prototype vector, computing device 102 may cause the notification to include a message that indicates motion blur as the predicted cause of the poor quality classification. In various implementations, computing device 102 may respond to a poor quality facial image by attempting to correct the quality issue in one or more subsequently captured facial images. As some examples, computing device 102 may adjust a flash brightness and/or intensity, adjust a flash activation (e.g., by deactivating flashbulb 122), etc. in the case of an overexposed image, adjust a shutter speed in the case of an image with motion blur, and take similar steps for other types of poor quality facial images. In some examples, computing device 102 may, upon classifying a captured image as poor quality, use the camera to capture a second image of the user (e.g., by sending an instruction to the camera to capture the second image). In some such examples, computing device 102 may display a prompt (e.g., as part of GUI 106) to indicate to a user that computing device 102 may capture the second image.

Techniques described herein may be implemented, at least in part, in hardware, software, firmware, or any combination thereof. For example, various aspects of the described embodiments may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described herein. In addition, any of the described units, modules or components may be implemented together or separately as discrete but interoperable logic devices. Depiction of different features as modules or units is intended to highlight different functional aspects and does not necessarily imply that such modules or units are realized by separate hardware, firmware, or software components. Rather, functionality associated with one or more modules or units may be performed by separate hardware, firmware, or software components, or integrated within common or separate hardware, firmware, or software components.

Techniques described herein may also be embodied or encoded in an article of manufacture including a computer-readable storage medium or computer-readable storage device encoded with instructions. Instructions embedded or encoded in an article of manufacture including an encoded computer-readable storage medium or computer-readable storage device, may cause one or more programmable processors, or other processors, to implement one or more of the techniques described herein, such as when instructions included or encoded in the computer-readable storage device are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. Additional examples of computer readable medium include computer-readable storage devices, computer-readable memory, and tangible computer-readable medium. In some examples, an article of manufacture may comprise one or more computer-readable storage media.

In some examples, computer-readable storage media may comprise non-transitory media. The term "non-transitory" may indicate that the storage medium is tangible and is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
   capturing, by a camera coupled to a computing device, an image;
   determining whether the image includes a representation of at least a portion of a face;
   responsive to determining that the image includes the representation of at least the portion of the face:
      comparing one or more spatial frequencies of the image to corresponding spatial frequencies of one or more previously classified images of a plurality of previously classified images, wherein each previously classified image of the plurality of previously classified images is classified as one of a good quality and a poor quality based on the spatial frequencies the respective previously classified image, and wherein each spatial frequency of the one or more spatial frequencies is associated with a visual transition between two or more adjacent pixels of the image; and
      classifying the image as a good quality image or a poor quality image based on the comparison.

2. The method of claim 1 further comprising:
   determining, based on the comparison of the one or more spatial frequencies of the image to the corresponding spatial frequencies of the one or more previously classified images of the plurality of previously classified images, whether the image includes less than or equal to a threshold amount of motion blur;
   responsive to determining that the image satisfies the threshold amount of motion blur, classifying the image as a good quality image; and
   responsive to determining that the image does not satisfy the threshold amount of motion blur, classifying the image as a poor quality image.

3. The method of claim 1,
   wherein the plurality of previously classified images includes a first portion of previously classified images classified as good quality images and a second portion of previously classified images classified as poor quality images,
   wherein comparing the one or more spatial frequencies of the image to the corresponding spatial frequencies of the one or more previously classified images of the plurality of previously classified images comprises:
      computing a first difference between the one or more spatial frequencies of the image and the corresponding spatial frequencies of each of the first portion of previously classified images; and
      computing a second difference between the one or more spatial frequencies of the image and the corresponding spatial frequencies of each of the second portion of previously classified images, and
   wherein classifying the image as a good quality image or a poor quality image based on the comparison comprises classifying the image as a good quality image or a poor quality image based on a comparison of the first computed difference to the second computed difference.

4. The method of claim 1, further comprising:
   identifying one or more target regions within the image;
   associating each spatial frequency of the plurality of spatial frequencies with a target region of the identified one or more target regions; and
   computing a frequency content associated with each target region from the one or more target regions based at least on one or more spatial frequencies associated with each target region.

5. The method of claim 4, further comprising:
   determining at least one energy value associated with the frequency content associated with each target region, wherein the at least one energy value is associated with a high frequency band;
   comparing the at least one energy value to a threshold energy value, wherein the threshold energy value is associated with a high frequency band of a prototype vector;
   if the at least one energy value is less than or equal to the threshold energy value, classifying the image as a high motion blur image; and
   if the at least one energy value is greater than the threshold energy value, classifying the image as a low motion blur image.

6. The method of claim 4, further comprising:
   generating a frequency representation of the image at least in part by applying a wavelet transform to the frequency content associated with each target region, wherein applying the wavelet transform comprises expressing two or more spatial frequencies of the frequency content as two or more corresponding wavelets; and
   computing a transition between the two or more corresponding wavelets.

7. The method of claim 4,
   wherein the one or more target regions comprise a representation of an eye of the face, and
   wherein computing the frequency content associated with each target region comprises computing a frequency content based on one or more spatial frequencies associated with a representation of an iris and a representation of a sclera of the eye, the method further comprising:
      determining at least one energy value associated with the frequency content associated with the representation of the eye, wherein the at least one energy value is associated with a very high frequency band;
      comparing the at least one energy value to a threshold energy value, wherein the threshold energy value is associated with the very high frequency band of a prototype vector;
      if the at least one energy value is less than or equal to the threshold energy value, classifying the image as a high motion blur image; and
      if the at least one energy value is greater than the threshold energy value, classifying the image as a low motion blur image.

8. The method of claim 7, wherein the very high frequency band is associated with frequency values that are greater than 0.8.

9. The method of claim 4,
   wherein the one or more target regions comprise a representation of a mouth region of the face, and
   wherein computing the frequency content associated with each target region comprises computing a frequency content based on one or more spatial frequencies associated with the mouth region, the method further comprising:
      determining at least one energy value associated with the frequency content associated with the representation of the mouth region, wherein the at least one energy value is associated with a high frequency band;
      comparing the at least one energy value to a threshold energy value, wherein the threshold energy value is associated with the high frequency band of a prototype vector;
      if the at least one energy value does not satisfy the threshold energy value, classifying the image as a high motion blur image; and
      if the at least one energy value satisfies the threshold energy value, classifying the image as a low motion blur image.

10. The method of claim 9, wherein the high frequency band is associated with frequency values that are greater than 0.7.

11. The method of claim 1, further comprising:
    responsive to classifying the image as a poor quality image based on the comparison, outputting a notification that indicates motion blur as a predicted cause of the poor quality image.

12. A device comprising:
    at least one programmable processor; and
    at least one camera operable to capture an image;
    wherein the at least one processor is configured to:
       determine whether the image includes a representation of at least a portion of a face; and
       responsive to determining that the image includes the representation of at least the portion of the face:
          compare one or more spatial frequencies of the image to corresponding spatial frequencies of each previously classified image of a plurality of previously classified images, wherein each previously classified image of the plurality of previously classified images is classified as one of a good quality and a poor quality based on the spatial frequencies the respective previously classified image, and wherein each spatial frequency of the one or more spatial frequencies is associated with a visual transition between two or more adjacent pixels of the image; and
          classify the image as a good quality image or a poor quality image based on the comparison.

13. The device of claim 12, further comprising at least one output device configured to, responsive to determining that the quality of the image is classified as poor quality, output a notification that the image is a poor quality image.

14. The device of claim 12, wherein the captured image is a first captured image, and wherein the at least one programmable processor is further configured to:
    responsive to determining that the quality of the image is classified as poor quality, send an instruction to the camera to capture a second image.

15. The device of claim 14, further comprising an output device, wherein the at least one programmable processor is further configured to:
    send an instruction to the output device to output a prompt to a user, wherein the prompt indicates the capture of the second image.

16. The device of claim 12, wherein the at least one programmable processor is further configured to:
    determine, based on comparing one or more spatial frequencies of the image to corresponding spatial frequencies of each previously classified image of a plurality of previously classified images, whether the image includes less than or equal to a threshold amount of motion blur;
    responsive to determining that the image satisfies the threshold amount of motion blur, classify the image as a good quality image; and
    responsive to determining that the image does not satisfy the threshold amount of motion blur, classify the image as a poor quality image.

17. The device of claim 12,
wherein the plurality of previously classified images includes a first portion of previously classified images classified as good quality images and a second portion of previously classified images classified as poor quality images,
wherein, to compare the one or more spatial frequencies of the image to the corresponding spatial frequencies of each previously classified image of the plurality of previously classified images, the at least one programmable processor is configured to:
  compute a first difference between the one or more spatial frequencies of the image and the corresponding spatial frequencies of the first portion of previously classified images; and
  compute a second difference between the one or more spatial frequencies of the image and the corresponding spatial frequencies of the second portion of previously classified images, and
wherein, to classify the image as a good quality image or a poor quality image based on the comparison, the at least one programmable processor is configured to classify the image as a good quality image or a poor quality image based on a comparison of the first computed difference to the second computed difference.

18. The device of claim 12, wherein the at least one programmable processor is further configured to:
  identify one or more target regions within the image;
  associate each spatial frequency of the plurality of spatial frequencies with a target region of the identified one or more target regions; and
  compute a frequency content associated with each target region from the one or more target regions based at least on one or more spatial frequencies associated with each target region.

19. A computer-readable storage device comprising instructions that, when executed, cause at least one processor of a computing device to:
  capture, using a camera operatively coupled to the computing device, an image;
  determine whether the image includes a representation of at least a portion of a face;
  responsive to determining that the image includes the representation of at least the portion of the face:
    compare one or more spatial frequencies of the image to corresponding spatial frequencies of each previously classified image of a plurality of previously classified images, wherein each previously classified image of the plurality of previously classified images is classified as one of a good quality and a poor quality based on the spatial frequencies the respective previously classified image, and wherein each spatial frequency of the one or more spatial frequencies is associated with a visual transition between two or more adjacent pixels of the image; and
    classify the image as a good quality image or a poor quality image based on the comparison.

20. The computer-readable storage device of claim 19, further comprising instructions that, when executed, cause the at least one processor of the computing device to:
  determine, based on comparing one or more spatial frequencies of the image to corresponding spatial frequencies of each previously classified image of a plurality of previously classified images, whether the image includes less than or equal to a threshold amount of motion blur;
  responsive to determining that the image satisfies the threshold amount of motion blur, classify the image as a good quality image; and
  responsive to determining that the image does not satisfy the threshold amount of motion blur, classify the image as a poor quality image.

21. The computer-readable storage device of claim 19,
wherein the plurality of previously classified images includes a first portion of previously classified images classified as good quality images and a second portion of previously classified images classified as poor quality images,
wherein the instructions that cause the processor of the computing device to compare the one or more spatial frequencies of the image to the corresponding spatial frequencies of each previously classified image of the plurality of previously classified images comprise instructions that, when executed, cause the processor of the computing device to:
  compute a first difference between the one or more spatial frequencies of the image and the corresponding spatial frequencies of the first portion of previously classified images; and
  compute a second difference between the one or more spatial frequencies of the image and the corresponding spatial frequencies of the second portion of previously classified images, and
wherein the instructions that cause the processor of the computing device to classify the image as a good quality image or a poor quality image based on the comparison comprise instructions that, when executed, cause the processor of the computing device to classify the image as a good quality image or a poor quality image based on a comparison of the first computed difference to the second computed difference.

22. The computer-readable storage device of claim 19, further comprising instructions that, when executed, cause the processor of the computing device to:
  identify one or more target regions within the image;
  associate each spatial frequency of the plurality of spatial frequencies with a target region of the identified one or more target regions; and
  compute a frequency content associated with each target region from the one or more target regions based at least on one or more spatial frequencies associated with each target region.

* * * * *